Figure 1:
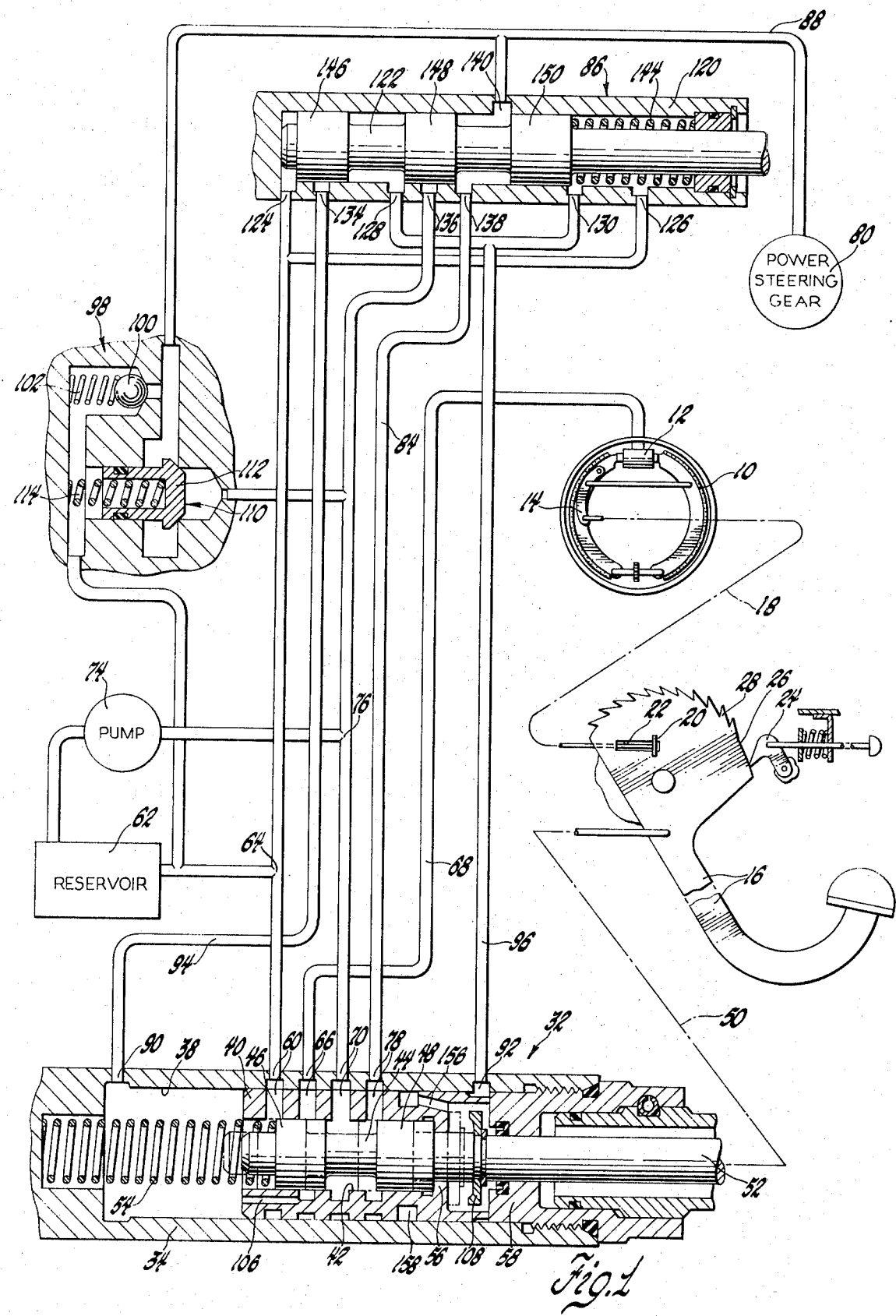

United States Patent [19]

Pocobello et al.

[11] 3,858,944
[45] Jan. 7, 1975

[54] VEHICLE BRAKE ACTUATING SYSTEM

[75] Inventors: Michael A. Pocobello, Warren; Harold E. Croswell, Sterling Heights; Harold E. Riisager, Rochester, all of Mich.

[73] Assignee: General Motors Corporation, Detroit, Mich.

[22] Filed: July 10, 1973

[21] Appl. No.: 377,950

[52] U.S. Cl. ................................. 303/2
[51] Int. Cl. ............................... B60t 13/58
[58] Field of Search ....... 303/2, 6 R, 13; 188/106 F, 188/106 P, 358

[56] References Cited
UNITED STATES PATENTS
3,333,902  8/1967  Liverance et al. .............. 303/2
3,424,281  1/1969  Kawabe et al. ............ 188/106 F Primary Examiner—George E A. Halvosa
Assistant Examiner—Charles E. Frankfort
Attorney, Agent, or Firm—D. D. McGraw

[57] ABSTRACT

A device for acutating a vehicle brake having a hydraulic actuator and a mechanical actuator. A brake pedal is connected in lost motion relation with the mechanical actuator. A valve housing has a piston slidable therein and a valve spool slidable in a central annulus of the piston. A push-pull cable connects the valve spool to the brake pedal. Movement of the brake pedal by the operator moves the valve spool to channel pressure fluid to the hydraulic brake actuator for operation thereof. A parking brake apply valve is operable by the vehicle operator to channel pressure fluid to the piston which moves the piston and the valve spool and the brake pedal connected thereto beyond the range of lost motion to operate the mechanical actuator.

3 Claims, 2 Drawing Figures

VEHICLE BRAKE ACTUATING SYSTEM

The invention relates to a vehicle brake system and more particularly to power actuated parking brake.

Vehicle wheel brakes typically include a hydraulic wheel cylinder for service actuation of the brake and a cable operated mechanical device for parking brake actuation of the brake.

It is known to provide a fluid pressure operated motor to tension the parking brake cable or to assist the vehicle operator in manual tensioning of the parking brake cable.

It is also known to operate a vehicle brake system with a single foot pedal which operates a hydraulic valve for service actuation of the brakes, the lever also being connected through a lost motion connection to the brake actuating cable so that upon over-travel of the pedal subsequent to loss of hydraulic pressure the cable is tensioned to mechanically apply the brakes.

The present invention provides a novel combined service and mechanical brake actuating device in which power assisted actuation of the mechanical parking brake is by a piston which surrounds the valve spool of the brake apply valve and upon pressurization moves the valve spool and brake pedal beyond their range of service brake actuation to tension the parking brake cable connected to the brake pedal by a lost motion connection.

The brake actuating device of this invention is utilized in a motor vehicle having a single foot operated brake pedal. The parking brake cable is connected to the foot pedal by a lost motion connection which permits a predetermined degree of pedal rotation before tensioning the cable. The brake apply valve includes a valve spool connected to the foot pedal by a push-pull cable. A piston is slidable in a housing of the brake apply valve and has a central annulus in which the valve spool is slidable. The housing and piston each have ports connected to a pump, a reservoir and the hydraulic actuator of the wheel brake. These ports are arranged with relation to the valve spool so that movement of the valve spool within the range of lost motion between the brake pedal and the parking brake cable channels pressurized fluid to the hydraulic actuator. The parking brake is applied by actuation of a parking brake apply valve which channels pump pressure to act on and move the piston. The piston has a shoulder which engages the valve spool to carry the valve spool beyond its range of movement associated with hydraulic actuation of the brake so that the push-pull cable pivots the brake pedal beyond its normal range of movement and tensions the parking brake cable. A conventional spring biased pawl engages ratchet teeth on the brake pedal to hold the brake pedal in the parking brake apply position.

Figure 2:
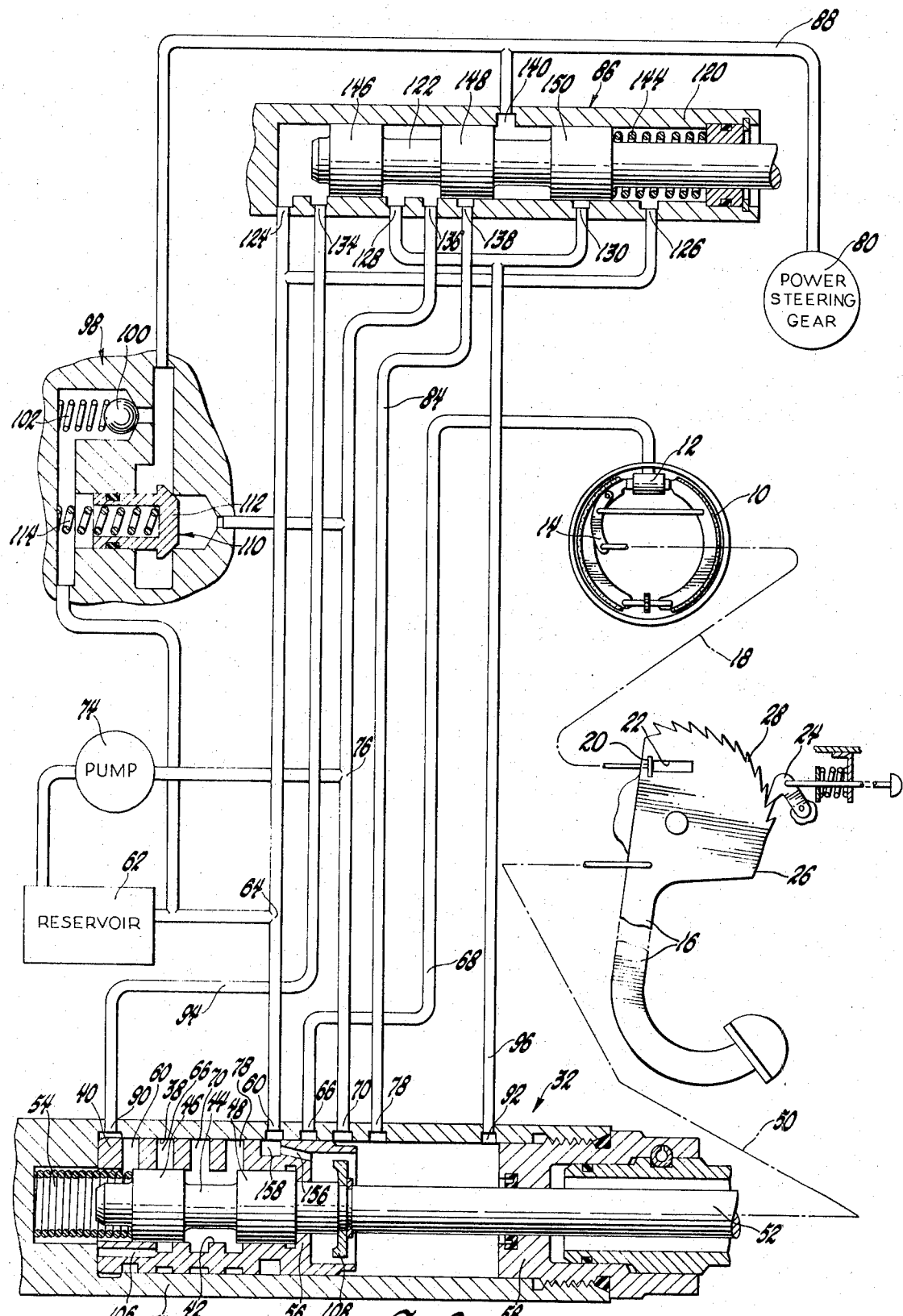

These and other features and advantages of the invention will become apparent upon consideration of the appended specification and the drawings in which:

FIG. 1 is a schematic illustration having parts broken away and in section showing a motor vehicle brake actuating system according to the invention in the brake release and hydraulic brake apply modes of operation; and FIG. 2 is a view similar to FIG. 1 showing the parking brake apply mode of operation.

Referring to FIG. 1 the invention is shown in a motor vehicle having a wheel brake 10 including a conventional hydraulic actuator 12 and a conventional mechanical actuator 14. A brake pedal 16 is pivoted to the vehicle body. A cable 18 attached to the mechanical actuator 14 is connected to the brake pedal 16 by a lost motion connection including a cable mounted stud 20 slidable in a slot 22 of the brake pedal 16. A conventional spring biased locking pawl 24 normally rides on a smooth portion 26 of the foot pedal 16 and is engageable in ratchet teeth 28 formed on an arcuate segment of the brake pedal 16 to maintain the angular position of the brake pedal 16 upon rotation of the pedal through a distance corresponding to the lost motion in the connection between cable 18 and pedal 16.

Actuation of the hydraulic brake actuator 12 of the wheel brake 10 is by a brake apply valve generally indicated at 32. The brake actuating valve 32 includes a bore 38 in which an annular piston 40 is sealingly slidable. The annular piston 40 in turn has a bore 42 in which a valve spool 44 having a land 46 and a land 48 sealingly slidable. A push-pull cable 50 is connected at one end to the brake pedal 16 and is connected at the other end to the valve spool 44 by a connector 52. The valve spool 44 assumes a normal brake release position at the urging of a spring 54 as shown in the solid lines of FIG. 1. In this normal position, the land 48 of the valve spool engages an annular abutment 56 of the annular piston 40 and the annular piston 40 engages a closure member 58 of the housing 34.

The housing 34 and annular piston 40 each have a plurality of like numbered ports which are aligned with one another when the annular piston 40 is in its normal position of FIG. 1. Ports 60 of housing 34 and annular piston 40 are connected to a reservoir 62 by a conduit 64. Ports 66 of the housing 34 and annular piston 40 are connected to the hydraulic actuator 12 of the wheel brake 10 by a conduit 68. Ports 70 of housing 34 and annular piston 40 are connected to a pump 74 by a conduit 76. Ports 78 of housing 34 and annular piston 40 are connected to power steering gear 80 via conduit 84, a parking brake apply valve 86 to be discussed hereinafter, and a conduit 88. Housing 34 also has vent ports 90 and 92 which are respectively connected via conduits 94 and 96 to the parking brake apply valve 86 and thence via conduit 64 to the reservoir 62. Parking brake apply valve 86 normally blocks vent port 90 and opens vent port 92 to the reservoir 62 as shown in FIG. 1.

When the valve spool 44 is in its normal position shown in FIG. 1, lands 46 and 48 are positioned with respect to ports 70 and 78 so that fluid flow from pump 74 is communicated unrestrictedly through the brake apply valve 32 to the power steering gear 80. This fluid returns to the reservoir 62 from the power steering gear 80 through a brake pressure limit valve 98 including a ball 100 biased by a spring 102.

When the brake pedal 16 is actuated by the vehicle operator, push-pull cable 50 pushes the valve spool 44 leftwardly toward the fully applied position as shown in the phantom lines of FIG. 1. In this position the flow from pump 74 at ports 70 is channeled to ports 66 and thence through conduit 68 to the hydraulic actuator 12 of the wheel brake 10 while land 46 blocks port 60. The brake actuating pressure is also channeled through a longitudinal passage 106 in the annular piston 40 to the leftward end of valve spool 44 where it assists spring 54 in providing a reaction force upon the valve spool 44. The ports 78 to power steering gear 80 is blocked by land 48.

When in the fully applied phantom line of FIG. 1, an annular ring 108 carried on the valve spool 44 engages the annular abutment 56 of the annular piston 40. The brake apply pressure communicated through longitudinal passage 106 to the leftward end of the valve spool 44 and annular piston 40 prevents the operator actuating force applied through the annular ring 108 from moving the piston 40 beyond phantom line indicated position of FIG. 1.

The brake pressure communicated to the hydraulic actuator 12 is limited by a brake pressure limit valve 110 including a valve element 112 and bias spring 114. When the brake pressure reaches a predetermined maximum level the valve element 112 is moved against the bias of spring 114 to communicate pump pressure in conduit 76 to conduit 88 and thence through the power steering limit valve 98 to the reservoir 62.

It will be noted that the range of movement of valve spool 44 between its brake release and fully brake applied position corresponds to the pivotal movement of foot pedal 16 through an arc corresponding to the smooth surface 26 and the lost motion in the connection between cable 18 and the brake pedal 16 so that the mechanical actuator 14 is not applied and the pawl 24 is not engaged in the ratchet teeth 28.

Parking brake actuation is initiated through operator actuation of the parking brake apply valve 86. The parking brake apply valve 86 includes a housing 120 in which a valve spool 122 is slidable. The housing 120 includes ports 124 and 126 connected to reservoir 60 via conduit 64. Ports 128 and 130 are communicated to vent port 92 of housing 34 via conduit 96. Port 134 is connected to vent port 90 via conduit 94. A port 136 is connected to pump 74 and port 70 of housing 34 via conduit 76. Port 138 is communicated to port 78 of housing 34 via conduit 84. Port 140 is communicated to power steering gear 80 and the brake pressure limit valve via conduit 88.

A spring 144 biases valve spool 122 to its normal position of FIG. 1 wherein a land 146 blocks communication of brake actuating valve vent port 90 to the reservoir 62; a land 148 blocks communication of pump 74 to conduit 96; a land 150 communicates conduit 96 to the reservoir 62; and lands 148 and 150 communicate ports 78 to the power steering gear 80.

Referring to FIG. 2, the vehicle operator initiates parking brake apply by actuation of a control instrumentality such as a knob, not shown, which moves the valve spool 122 to the shown position. In this position pump 74 is communicated via conduit 96 and port 92 to the rightward end of piston 40 whereby the piston 40 is forced leftwardly to its position of FIG. 2. Movement of land 146 opens communication of vent port 90 to the reservoir 62 permitting the fluid ahead of the piston 40 to be returned to the reservoir. When the annular piston 40 reaches its full leftward position as shown in FIG. 2, the pump flow is returned to the reservoir via a passage 156 and a groove 158 in the piston 40 which becomes aligned with the port 60 of the housing 34. The valve spool 44 is carried with the annular piston 40 during its leftward movement by virtue of engagement of the annular abutment 56 of the annular piston with the land 48 of the valve spool 44. The brake pedal 16 is pulled to its position of FIG. 2 by the push-pull cable 50. Such movement takes up the entire lost motion in the connection between the cable 18 and brake pedal 16 so that the parking brake 14 is actuated. The pawl 24 engages ratchet teeth 28 to hold the brake pedal 16 in its fully actuated rotary position so that tension is maintained on the parking brake cable 18. Release of the parking brake is by manual disengagement of the pawl 24 from the ratchet teeth 28 in the conventional manner.

Thus it is seen that a novel brake system is provided wherein parking brake actuation is by virtue of a piston surrounding a brake apply valve and moving the brake apply valve beyond its normal range of movement to fully actuate the brake pedal.

What is claimed is:

1. An actuating device for a vehicle brake having a hydraulic actuator and a mechanical actuator and comprising, a housing, a valve spool connected in lost motion relation with and operating the mechanical actuator upon predetermined movement of the valve spool, a piston slidable in the housing and having a central annulus slidably receiving the valve spool, means for holding the piston in a normal stationary position in the housing, port means in the piston and the housing cooperable with the valve spool to channel operating pressure fluid to the hydraulic actuator upon movement of the valve spool relative the piston, means acting between the valve spool and the piston to carry the valve spool with the piston upon movement of the piston from the normal position, and port means in the housing introducing pressure fluid to move the piston from the normal position whereby the predetermined movement is imparted to the valve spool and the mechanical actuator is operated.

2. A motor vehicle brake system comprising, a wheel brake having a hydraulic actuator and a mechanical actuator, a brake pedal, a lost motion connection between the mechanical actuator and the brake pedal for actuating the mechanical actuator upon movement of the brake pedal beyond the range of lost motion, a brake apply valve having a valve spool for selectively channeling pressure fluid to the hydraulic actuator and being operatively connected to the foot pedal for actuation upon movement of the foot pedal within the range of lost motion, piston means located within the brake apply valve and being engageable with and carrying the valve spool beyond a normal range of movement associated with channeling pressure fluid to the hydraulic actuator, and operator actuated valve means channeling pressure fluid to act upon and move the piston whereby the valve spool and brake pedal are moved beyond the lost motion of the lost motion connection between the brake pedal and mechanical actuator to operate the mechanical actuator.

3. A motor vehicle brake system comprising a wheel brake having a hydraulic actuator and a mechanical actuator, a pivotally mounted brake pedal connected in lost motion relation with and operating the mechanical actuator upon predetermined pivotal movement of the brake pedal, a valve spool operatively connected to the foot pedal, a valve housing, piston slidable in the valve housing and having a central annulus slidably receiving the valve spool, means for holding the piston in a normal position in the housing, port means in the piston and the valve housing cooperable with the valve spool to channel operating pressure fluid to the hydraulic actuator upon movement of the valve spool relative the piston, operator actuated valve means channeling pressure fluid to act upon and forcibly move the piston from the normal position, means acting between the valve spool and the piston to carry the valve spool with the piston upon movement of the piston from the normal position so that the brake pedal operatively connected to valve spool is pivoted beyond the lost motion of the lost motion connection to operate the mechanical actuator, and means for holding the brake pedal at its pivotal position providing operation of the mechanical actuator.

* * * * *